May 27, 1958 W. D. CALDWELL 2,836,022
SPECIFIC DRIVE AND MOUNTING MEANS FOR A FORAGE HARVESTER
Filed June 30, 1953 5 Sheets-Sheet 5
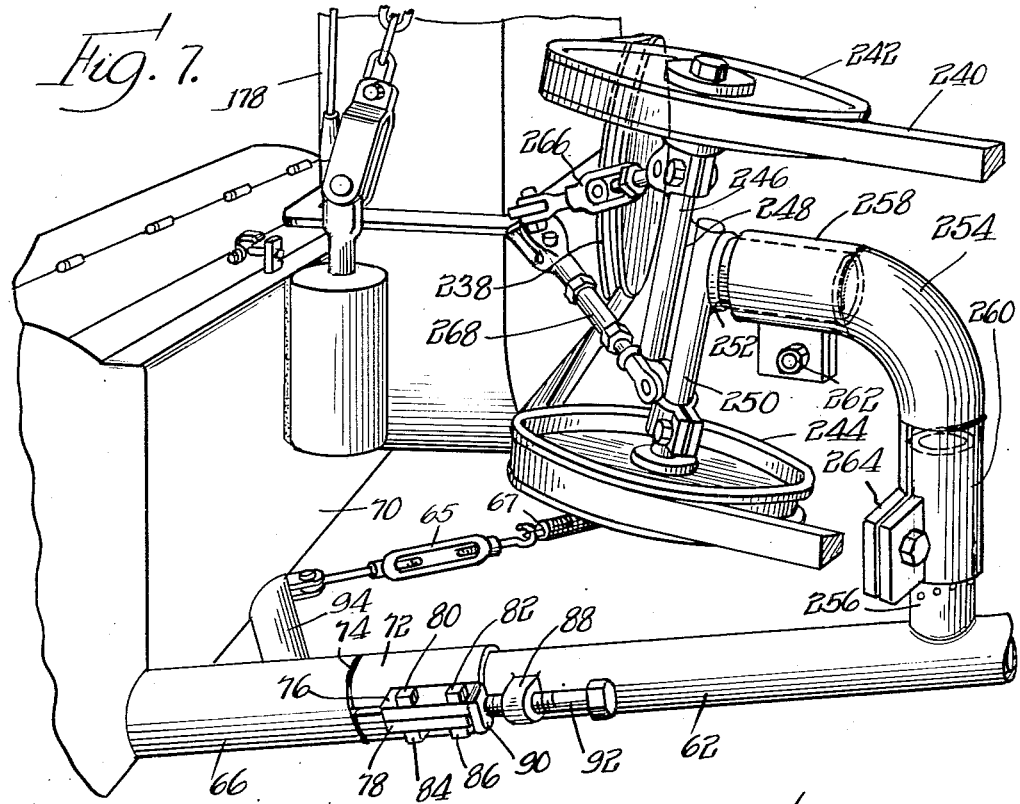
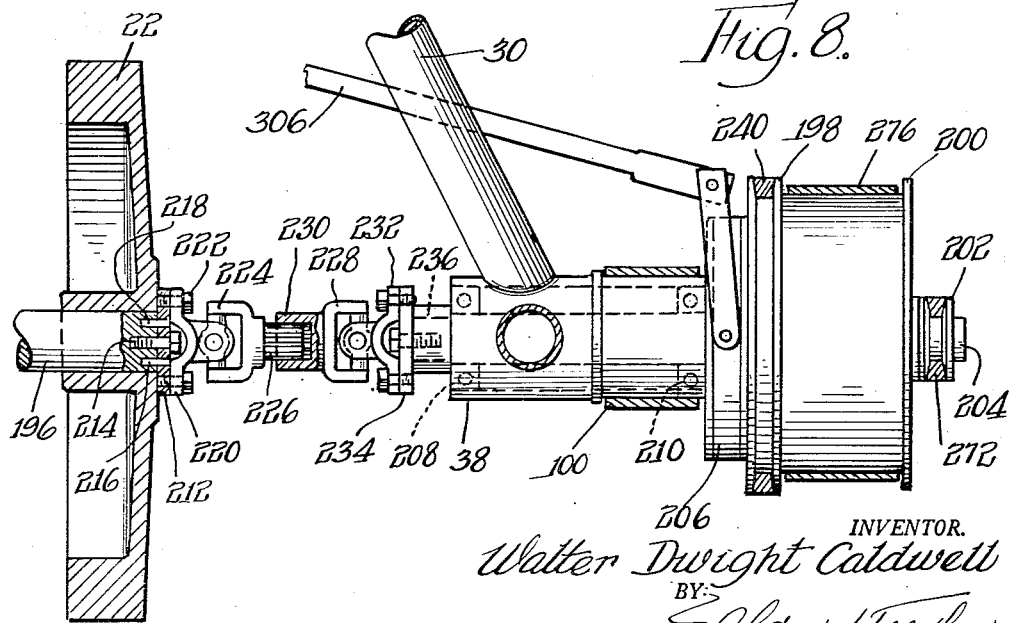
INVENTOR.
Walter Dwight Caldwell
BY:
Olson & Trexler
Attys

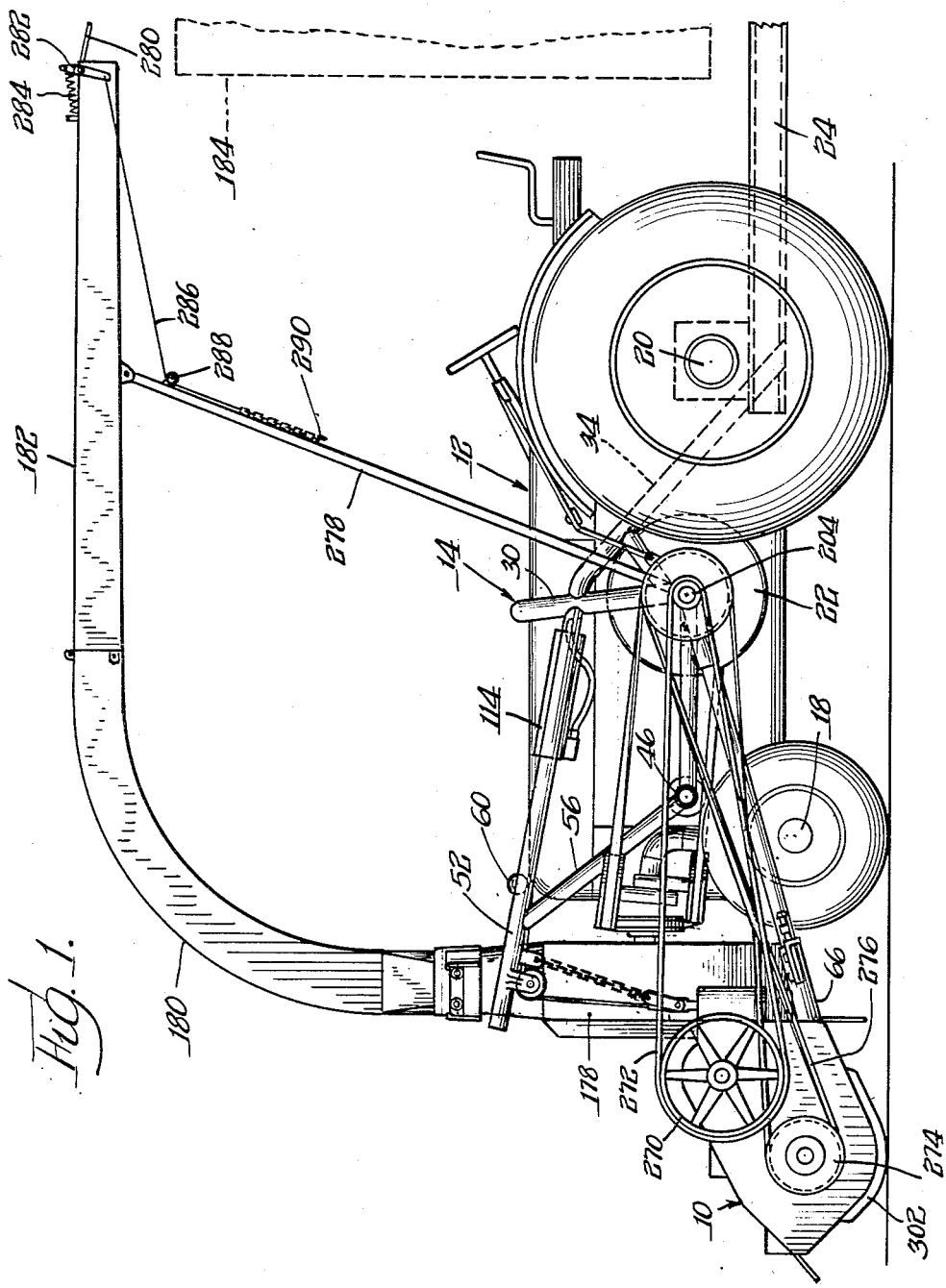

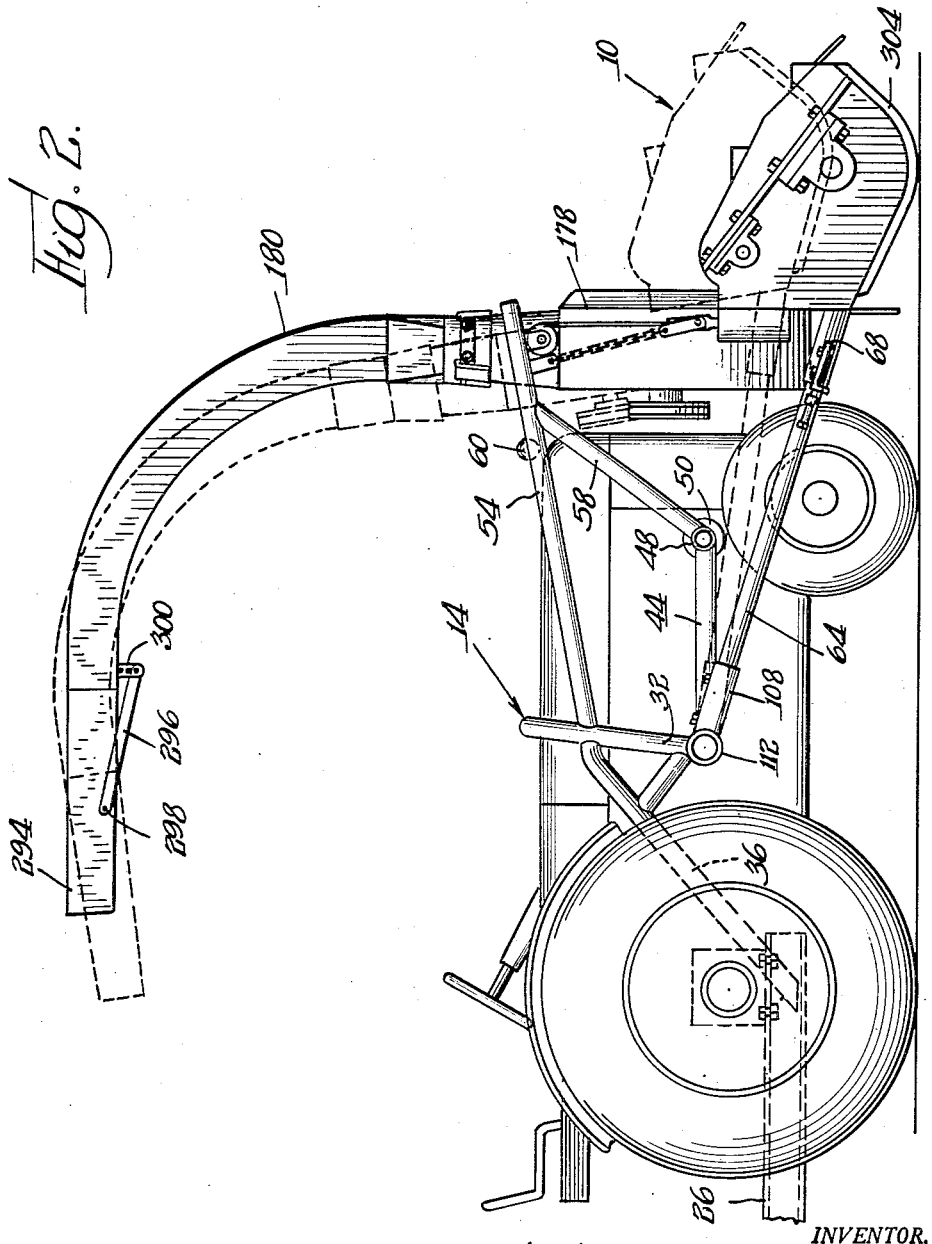

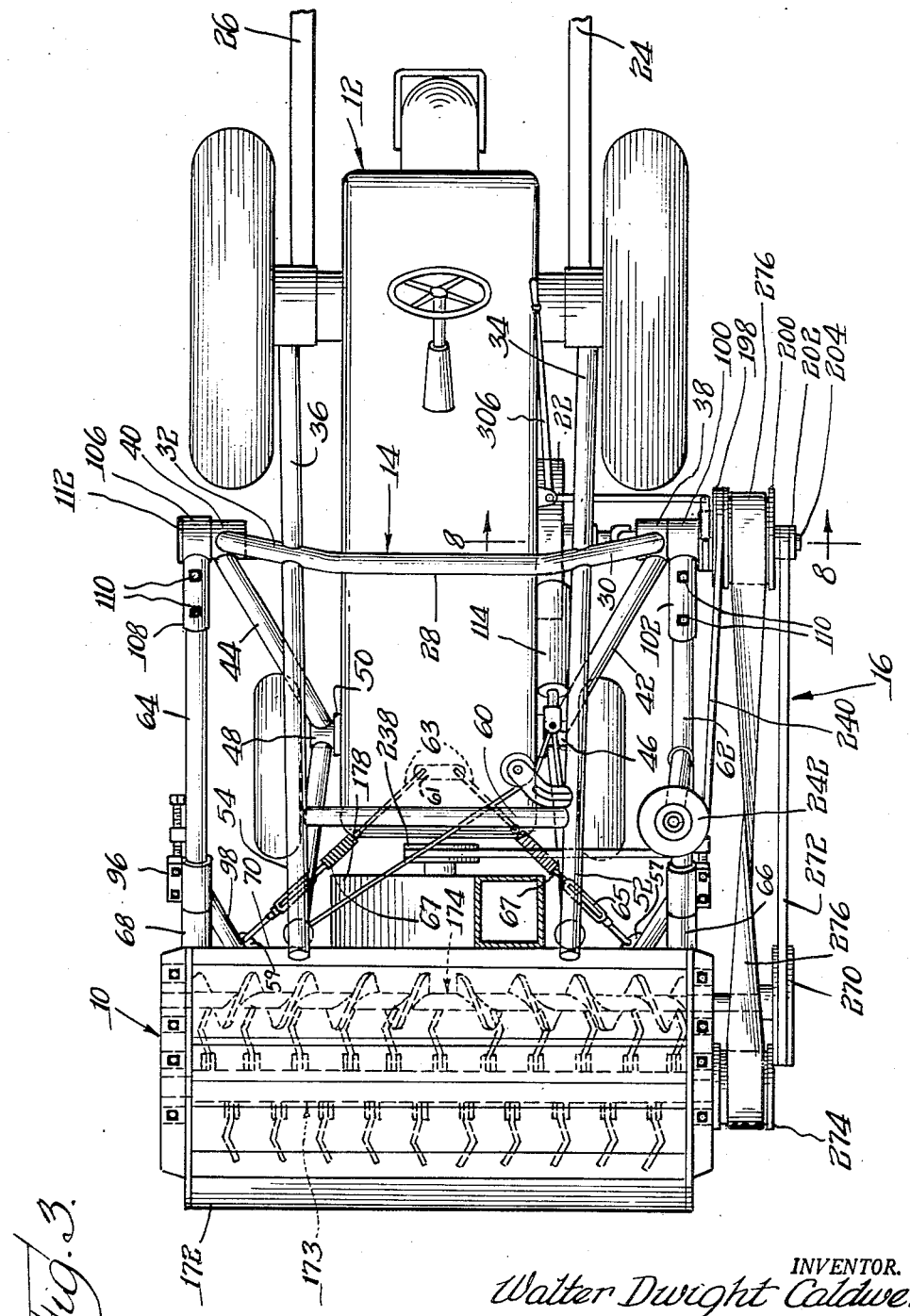

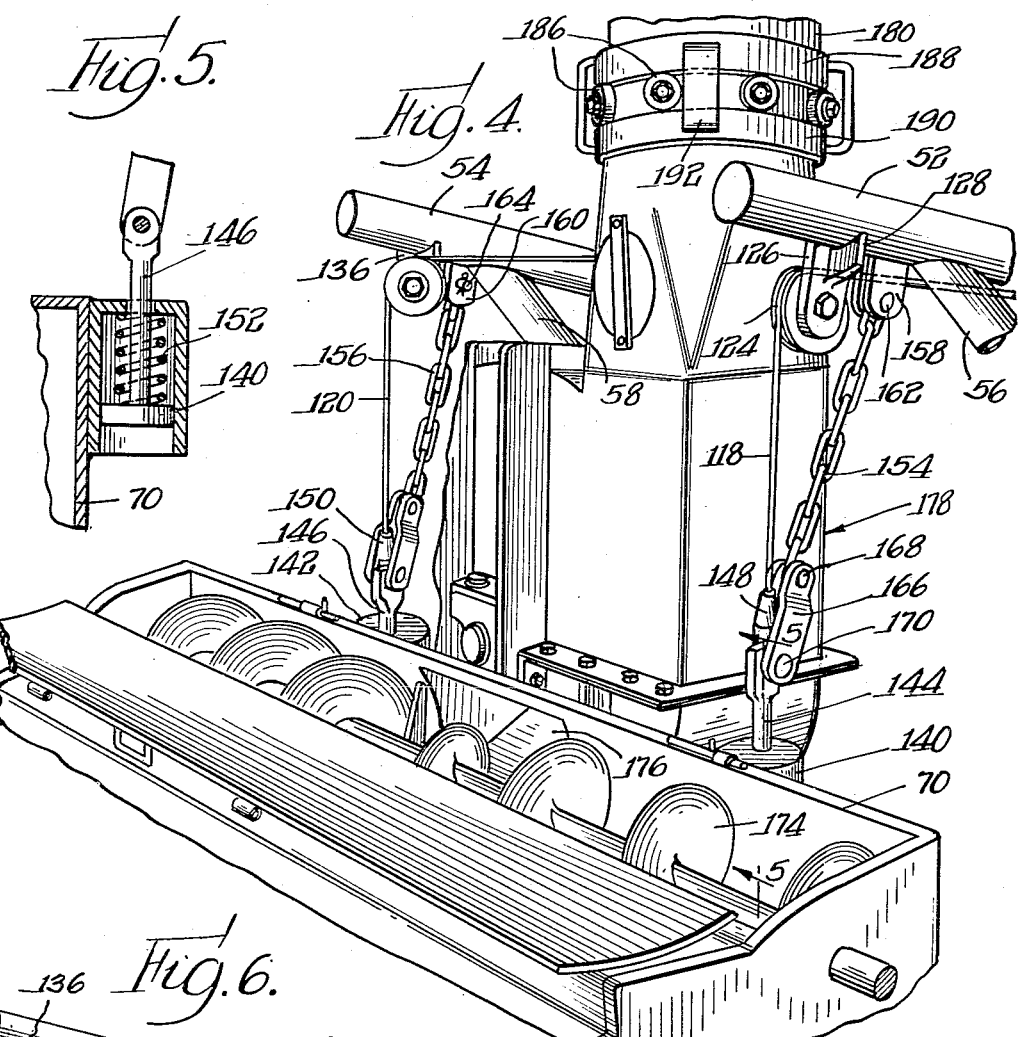
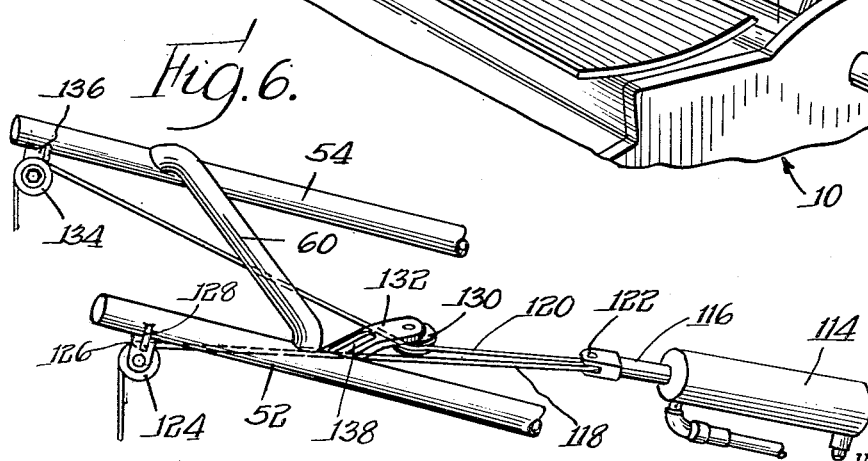

United States Patent Office 2,836,022
Patented May 27, 1958

2,836,022
SPECIFIC DRIVE AND MOUNTING MEANS FOR A FORAGE HARVESTER

Walter Dwight Caldwell, Prairie City, Iowa

Application June 30, 1953, Serial No. 365,113

5 Claims. (Cl. 56—10)

The present invention relates to a novel forage harvesting machine, and more particularly to a harvesting machine of the field type for harvesting crops and crop residues.

Harvesting machines heretofore known in the prior art have been more or less successfully operated, but these machines present certain problems which the present invention proposes to overcome. For example, certain prior art harvesting machines are not entirely satisfactory for use over irregular terrain since the irregularities in the terrain prevent these machines from uniformly harvesting the crop. In addition, certain prior art machines are drawn behind a tractor so that the crop is run down by the tractor and damaged before harvesting. It is, therefore, an object of the present invention to overcome these problems by providing a novel harvesting machine which is capable of uniformly harvesting crops regardless of the terrain and which is pushed in front of the tractor so that the crops are harvested before they can be run down or flattened by the tractor.

Another object of the present invention is to provide a simple and sturdy structure for mounting harvesting apparatus on a suitable vehicle such as a tractor.

Still another object of the present invention is to provide novel means for mounting harvesting apparatus on a tractor or the like so that the apparatus is self-adjustable to accommodate variations in ground contour, whereby the crops may be uniformly harvested.

Another object of the present invention is to provide a harvesting apparatus of the above described type with novel and simple means for connecting rotatable elements of the aparatus with a source of power on a vehicle such as a tractor.

Other objects and advantages of the present invention will become apparent from the following description and the accompanying drawings, wherein:

Fig. 1 is a side elevational view, showing the novel apparatus of this invention;

Fig. 2 is a side elevational view, showing the opposite side of the apparatus shown in Fig. 1;

Fig. 3 is a plan view, partially in cross section, of the apparatus embodying the principles of this invention;

Fig. 4 is an enlarged fragmentary perspective view of the apparatus embodying the principles of this invention;

Fig. 5 is a fragmentary cross sectional view taken along line 5—5 in Fig. 4;

Fig. 6 is a fragmentary perspective view, showing the means for raising and lowering the harvesting apparatus of this invention;

Fig. 7 is an enlarged fragmentary perspective view, showing novel features of the present invention; and Fig. 8 is an enlarged view partially in cross section taken along line 8—8 in Fig. 3.

Referring now more specifically to the drawings, wherein like parts are designated by the same numerals, the apparatus embodying the principles of this invention includes a harvesting unit 10 mounted on a suitable vehicle such as a tractor 12 by means of a novel frame structure 14, which harvesting unit is connected with the tractor engine through drive means 16.

The tractor 12 may be of any standard design and includes front and rear axles 18 and 20 with suitable wheels mounted on the axles. The tractor is preferably provided with a standard lateral power takeoff which includes a flywheel 22. The usual draw bars 24 and 26 are connected to the frame of the tractor by any suitable means such as bolts.

The frame 14 for mounting the harvesting unit on the tractor includes an inverted generally U-shaped transverse member 28 which is positioned over the hood of the tractor and has legs 30 and 32 extending downwardly along the sides of the tractor. Frame members 34 and 36 are welded to the legs 30 and 32, respectively, as shown in Figs. 1 through 3, and extend downwardly with their opposite ends welded or otherwise connected to the tractor draw bars 24 and 26, respectively. The tractor draw bars thus provide rear mounting means for securing one end of the frame 14 to the tractor adjacent the rear axle of the tractor. The lower ends of the arms 30 and 32 are welded to short pipe sections or bushings 38 and 40, respectively. Frame members 42 and 44 are also connected to these bushings and extend forwardly to a point where they are welded to pipe sections 46 and 48, respectively. These pipe sections 46 and 48 are provided with plugs welded therein for accommodating bolts, not shown, whereby the pipe sections may be secured to the frame of the tractor either directly or to a suitable member 50 which extends across the frame of the tractor. Thus, the pipe sections 46 and 48 provide means for securing the forward end of the frame 14 to the tractor, and it should be noted that these pipe sections are adjacent the front axle of the tractor. The frame 14 is, therefore, mounted on the tractor so that the load is applied to the tractor frame at or adjacent the axles, whereby the tractor frame is not unduly strained. Frame members 52 and 54 extend forwardly from the arms 30 and 32, respectively, for a purpose to be described more fully hereinbelow. The forward ends of these frame members 52 and 54 are supported by members 56 and 58, respectively, which latter members are also welded to the pipe sections 46 and 48. The frame members described hereinabove are preferably formed from steel pipes and connected together as by welding, whereby a simple rigid and yet relatively lightweight structure is obtained. If desired, other members may be added to the frame to provide suitable bracing, such as the transverse member 60 between forward portions of the frame members 52 and 54.

The harvesting unit 10 is connected with the frame 14 by means of a pair of boom sticks 62 and 64. The boom sticks 62 and 64 are adjustably connected to the harvesting unit by means of sleeves 66 and 68, respectively. These sleeves are preferably welded directly to the rear wall 70 of the harvesting unit housing. As shown in Fig. 3, a pair of stabilizers 63 are mounted between the harvesting unit 10 and the tractor by means of suitable brackets 57, 59 and 61. Each of the stabilizers includes a turnbuckle 65 and a tension spring 67. By this structure, the stabilizers may be adjusted as desired, and the springs provide sufficient resiliency to prevent damage to the apparatus when severe stresses are applied thereto.

As shown best in Fig. 7, the sleeve 66 is provided with a split end portion 72 which may be expanded for readily receiving the end of the boom stick 62 and then contracted for securely gripping the boom stick. This split portion is preferably provided by a separate pipe section which is welded as at 74 to the main body of the sleeve 66. It should be noted that the weld 74 extends only partially around the circumference of the sleeve. In order to adjust the split pipe section 72, a pair of lugs 76 and 78 are welded thereto and provided with aligned apertures for receiving bolts 80 and 82. The lugs are drawn together by tightening nuts 84 and 86 down on the bolts, which action, of course, also draws the split pipe section 72 together for securely gripping the boom stick 62. In order to adjust the effective combined length of the boom stick 62 and the sleeve 66, a nut 88 and an abutment member 90 are welded to the boom stick 62 and to the sleeve 66, respectively. An adjusting screw 92 is threaded through the nut 88 until it engages the abutment member 90. Preferably, the abutment member 90 is secured to the sleeve 66 by welding it to either of the lugs 76 or 78. If desired, an angularly disposed brace 94 may be welded between the housing wall 70 and the sleeve 66. The sleeve 68 for receiving the boom stick 64 is constructed the same as the sleeve 66 and, therefore, need not be described in detail. Thus, the sleeve 68 includes a split pipe section 96, and an angularly disposed brace 98 is welded between the sleeve 68 and the harvesting unit housing.

The boom stick 62 is pivotally secured to the frame 14 by the means shown best in Figs. 3 and 8. This means includes a collar 100 rotatably mounted on the frame sleeve 38. A short pipe section 102 adapted to receive the end of the boom stick 62 is welded to the collar 100. The pipe section 102 and the boom stick 62 are provided with a plurality of aligned apertures for receiving bolts 104, which bolts hold the boom stick in the sleeve 102.

The boom stick 64 is pivotally mounted on the frame sleeve 40 by means of a collar 106 and a short pipe section 108. Bolts 110 extend through the boom stick 64 and the pipe section 108 for retaining these parts together. The outer end of the frame sleeve 40 is formed with a flange 112 for retaining the collar 106 thereon.

With the above described structure, it is seen that the harvesting unit 10 is pivotally connected with the frame 14 so that the unit can be lowered during harvesting operations or raised to clear obstacles and for permitting the unit to be transported from one location to another. The means for raising and lowering the harvesting unit is shown best in Figs. 4, 5, and 6 and includes a hydraulic cylinder 114 having a piston rod 116 for actuating control cables 118 and 120. The control cables may be connected to the piston rod by any suitable means such as a pin 122. The hydraulic cylinder is preferably mounted on one side of the frame 14 and is connected with a suitable source of hydraulic fluid (no shown) on the tractor. In the embodiment illustrated, the cylinder 114 has been mounted on the frame member 52.

As shown in Figs. 4 and 6, the control cable 118 passes over a pulley 124 mounted adjacent the front end of the frame member 52. The pulley is mounted by means of a bracket having a generally flat arm-like portion 126 and a perpendicularly extending strengthening member 128 welded thereto. The arm 126 and the member 128 are secured to the frame member 52 by welding. The control cable 120 passes around a pulley 130 mounted on an arm 132 and thence over a pulley 134 carried by a bracket 136. The arm 132 is welded to the frame member 52 and is reinforced by a perpendicularly extending flange 138. The bracket arm 136 is welded to the frame member 54 and may be reinforced by a perpendicularly extending member (not shown) similar to the member 128 for the bracket arm 126.

The control cables 118 and 120 are connected to the rear wall 70 of the harvesting unit housing by the means shown best in Figs. 4 and 5. This means includes a pair of cylinders 140 and 142 welded to the housing wall 70. Pistons 144 and 146 operate within the cylinders 140 and 142, respectively. The control cables are connected to the pistons by any suitable members 148 and 150. As shown best in Fig. 5, a compression spring 152 is mounted within the cylinder 140 and operates against the piston 146. A similar spring is provided within the cylinder 142. These springs in effect provide a resilient support for the harvester unit and eliminate severe stresses and shocks to the hydraulic cylinder and control cables whenever the harvester unit is raised or lowered or merely during periods when the tractor is being driven from one location to another. In order to provide means for positively limiting downward movement of the harvester unit without stressing the control cables or the hydraulic cylinder, chains 154 and 156 are provided. These chains are respectively secured to the frame members 52 and 54 by means of brackets 158 and 160 and pins 162 and 164. The pins 162 and 164 are removable, whereby the length of the chains may be adjusted to determine the lower limit of downward movement of the harvesting unit. Thus, the chains may be adjusted to lower the harvesting unit to permit harvesting operations and may be shortened to support the harvesting unit in an elevated position during transportation of the unit from one location to another. The lower end of the chain 154 is secured to the piston 144 by a link 166 and pins 168 and 170. The lower end of the chain 156 is similarly secured to the piston 146. Thus, while the chains limit the downward movement of the harvesting unit, undue shocks and stresses are avoided because of the compression springs within the cylinders.

The harvesting unit 10 includes a housing 172 having the above mentioned rear wall 70, which housing extends transversely across the front of the tractor. A rotatable member 173 having a plurality of radially extending cutting or material working arms is mounted within the housing for initially gathering or harvesting the crops. A screw conveyor 174 is mounted within the housing for receiving the harvested crops and directing them toward an outlet opening 176 in the rear wall of the housing. A blower 178 is mounted on the harvesting unit housing for removing the harvested crops therefrom and directing the crops to a suitable point of discharge. A stack 180 is connected with the blower for directing the crops to a suitable receiving means, such as a truck or the like. If desired, an extension 182 may be attached to the stack 180 for conveying the harvested crops to a trailer 184 pulled behind the tractor, as illustrated in Fig. 1.

As shown best in Fig. 4, a plurality of rollers 186 are mounted about the outlet of the blower, and the stack 180 is supported on these rollers by means of a pair of collars 188 and 190, which collars are joined together by members 192. With this structure, the stack may be turned 360°, whereby the crops may be deposited at any desired point.

In order to drive the rotatable harvesting member 173, the screw conveyor 174, and the blower 178, suitable drive means adapted to be connected with the tractor engine are provided, which drive means are shown best in Figs. 1, 3, 7, and 8. The tractor is preferably of the type having a lateral power takeoff with a flywheel 22 mounted on a shaft 196, as shown best in Fig. 8. A drive assembly including rotatable members such as pulleys 198, 200, and 202 is mounted on the frame 14 and is adapted to be connected to the flywheel. These pulleys are mounted on a shaft 204 and are adapted to be operatively connected with the shaft by a suitable clutch means 206. The shaft 204 extends through and is rotatably mounted in the frame sleeve or bushing 38 by means of suitable roller bearings 208 and 210, as shown best in Fig. 8. The shaft 204 is connected with the flywheel by flexible couplings.

The connection between the shaft 204 and the flywheel is shown best in Fig. 8 and includes a base plate member 212 secured to the flywheel shaft by means of a screw 214. A pair of pins 216 and 218 are provided for locking the base plate in position. One part 220 of a flexible coupling is mounted to the base plate by suitable screws 222. The complementary part 224 of the flexible coupling includes a splined stub shaft 226. A second flexible coupling is provided which includes a member 228 having a socket 230 receiving said splined stub shaft and interengaging therewith. The other part 232 of the second flexible coupling is mounted to a cap member 234 which in turn is secured to the shaft 204 by a screw 236. With this structure, it is seen that long and expensive drive shafts are eliminated and that considerable misalignment between the shafts 196 and 204 may be accommodated.

The blower 178 is provided with a pulley 238 which is driven by the drive pulley 198 through a V-belt 240. As shown best in Fig. 3, the drive pulley 198 is located at one side of the apparatus, while the blower pulley is located substantially centrally of the apparatus. Therefore, a pair of idler guide pulleys 242 and 244 are provided, as shown best in Fig. 7. The pulley 242 is rotatably mounted on an axle 246, which axle is welded, as at 248, to another axle 250 carrying the pulley 244. The axle 250 is in turn welded to a plug 252 which fits within a support 254. The support 254 is mounted on the boom stick 62 by means of an upstanding pipe section 256. Preferably, the support member 254 is provided with split pipe sections 258 and 260 which are welded thereto and adapted to be tightened to grip securely the plug 252 and the upstanding pipe section 256, respectively. The split pipe sections 258 and 260 are provided with tightening means 262 and 264, respectively, which are substantially identical to the tightening means for the above described split pipe section 72 and, therefore, need not be described in detail. With this structure, the pulleys 242 and 244 may be adjusted and arranged to assure proper operation of the V-belt 240. In order to brace the idler pulley assembly, a turnbuckle 266 is mounted between the blower housing and the axle 246 by suitable brackets, and a second turnbuckle 268 is similarly mounted between the blower housing and the axle 250.

The screw conveyor is driven by means of a pulley 270 mounted on the shaft thereof and a V-belt 272 operable over the pulleys 202 and 270. In the arrangement shown, the screw conveyor is driven in a counterclockwise direction, as viewed in Fig. 1, so that the harvested crops are directed toward the outlet opening in the harvesting unit housing. The harvesting member 173 is provided with a pulley 274 which is driven from the pulley 200 by belt 276. Since it is necessary to drive the harvesting member 173 in a clockwise direction, the belt 276 is twisted in a well known manner to accomplish this result.

The operation of the above described apparatus is as follows. The tractor is driven to the point where the harvesting operation is to begin with the harvesting unit 10 supported in the raised position shown in dotted lines in Fig. 2. The harvesting unit is then lowered by actuating the hydraulic cylinder 114 through suitable controls, not shown. The crop discharge stack 180 with its extension 182, as shown in Fig. 1, is adjusted so that the crops will be directed into the trailer 184 which is pulled behind the tractor. Since the discharge stack and extension are structurally relatively weak, it is generally desirable to provide a suitable brace 278 which is connected between the extension 182 and the frame 14, as shown in Fig. 1. The outlet end of the extension 182 is provided with a pivotally mounted deflector 280 which is normally biased to an open position by means of a lever 282 and a spring 284. The deflector may be closed by means of the cable or chain 286 connected with the lever 282 and passing over a pulley 288 mounted on the support 278. In Fig. 1, the deflector is shown in its open position with the end of the chain secured to a hook 290. However, by pulling down on the chain and passing an intermediate link thereof over the hook 290, the deflector 280 may be adjusted as desired.

In the embodiment shown in Fig. 2, the stack extension 182 has been replaced by a relatively short guide 294 which may be hinged to the stack 180. The guide 294 has an open bottom and outlet end so that it may be adjusted to various angles with respect to the stack 180 without danger of becoming clogged with the harvested crops. The guide 294 may be adjusted by means of a lever 296 pivoted thereto, as at 298, and having a pin insertable through one of a pluralty of apertures in the bracket 300 secured to the stack 180. This form of discharge stack and guide is particularly suitable in cases where it is desirable to deposit the harvested crops in a truck driven along the side of the tractor.

The harvesting unit 10 is lowered until skids 302 and 304 contact the ground, as shown in Figs. 1 and 2. These skids are mounted on the lower edges of the end walls of the harvesting unit housing and serve to guide the housing over the terrain regardless of any irregularities in the terrain. Since the harvesting unit 10 is pivotally connected to the tractor by means of the boom sticks, it will always follow the contour of the ground, whereby the crops will be evenly harvested. However, in the event the harvesting unit is driven over an unusually deep hole or trench or the like, downward movement thereof is limited by the chains 154 and 156.

With the harvesting unit lowered to the ground as described, the clutch 206 is actuated by suitable linkage mechanism 306 to connect operatively the drive pulleys 198, 200, and 202 with the shaft 204. This, of course, actuates the harvesting means 172, the screw conveyor 174, and the blower 178. As the tractor is driven across the field, the crops are harvested before any possible damage thereto by reason of being run down by the tractor.

From the above description, it is seen that the present invention has provided a relatively simple and rugged apparatus for efficiently and evenly harvesting crops. Furthermore, it is seen that with the structure described above, the apparatus may be relatively easily and quickly installed and adjusted to provide optimum results.

While the preferred embodiments of the present invention have been shown and described herein, it is obvious that many structural details may be changed without departing from the spirit and scope of the appended claims.

I claim:

1. An apparatus for working material on or above the ground, comprising frame means adapted to be mounted on a vehicle such as a tractor, a pair of boom structures comprising pipe sections pivotally mounted to said frame means, material working means carried by said boom structures, and means mounting the material working means on said boom structures, said last mentioned means including pipe sections attached to the material working means and telescoping with the pipe sections of the boom structures, some of said pipe sections having means for adjusting the cross sectional dimensions thereof, whereby the pipe sections of the boom structures and the pipe sections of the mounting means grip each other.

2. An apparatus, as defined in claim 1, which includes some of said pipe sections having split portions, lugs extending from said split portions, and bolt means operable on said lugs for adjusting the cross sectional dimensions of said split portions.

3. An apparatus for working material on and above the ground, comprising frame means adapted to be mounted on a vehicle such as a tractor, front and rear mounting means for detachably securing said frame means to a vehicle adjacent the front and rear axles of the vehicle, a pair of spaced boom structures pivotally mounted to said frame means between said front and rear mounting means and extending forwardly of the vehicle, material working means mounted between the forward ends of said boom structures, means on said material working means for guiding the material working means over the surface of the ground, and resilient means connected between said frame means and said material working means for limiting downward movement of the material working means, said resilient means including a cylinder interconnected with said material working means, a piston operable within said cylinder, spring means within said cylinder for resisting movement of the piston in one direction, and a flexible substantially non-stretchable element connecting between said frame means and said piston.

4. A harvesting machine, comprising frame means adapted to be mounted on a vehicle such as a tractor, a pair of boom structures pivotally mounted on said frame means for movement about a predetermined axis and extending forwardly of the vehicle, means mounted between the forward ends of the boom structures and including rotatable means for harvesting crops, and blower means mounted between said boom structures and communicating with said rotatable means for conveying the harvested crops to a point of discharge, drive pulley means mounted on said frame means for rotation about said axis, and adapted to be driven from a power take off on the vehicle, which axis is substantially axially aligned with the power take off on the vehicle, driven pulley means connected with said rotatable means, an endless belt-like member on said drive pulley means and said driven pulley means for driving the rotatable means, blower pulley means connected with said blower, and an endless belt-like member on said drive pulley means and said blower pulley means for driving said blower, said blower pulley means being offset from said drive pulley means and mounted for rotation about an axis disposed at an angle to the axis of the drive pulley means, and an idler pulley assembly mounted on one of said boom structures for guiding said last mentioned belt-like member from said drive pulley means to said blower pulley means.

5. An apparatus for working material on and above the ground, comprising frame means adapted to be mounted on a vehicle, such as a tractor, front and rear mounting means on said frame means for securing said frame means to a vehicle, a pair of spaced boom structures pivotally mounted to said frame means between said front and rear mounting means and extending forwardly of the vehicle, rotatable material working means mounted between the forward ends of the boom structures, means including a rotatable member and endless belt-like means for driving said material working means, said rotatable member being mounted for rotation about the pivotal axis of said boom structures, and means for connecting said rotatable member with a source of power on the vehicle, said last mentioned means including a pair of flexible couplings extending generally along the pivotal axis of said boom structure for interconnecting a drive shaft on the vehicle with said rotatable member, one of said flexible couplings including a short stub shaft, and the other of said flexible couplings including a short sleeve receiving said stub shaft, said stub shaft and sleeve being interengageable to provide a driving connection.

References Cited in the file of this patent

UNITED STATES PATENTS

| | | |
|---|---|---|
| 1,301,289 | Malcom | Apr. 22, 1919 |
| 1,504,516 | Schmechel et al. | Aug. 12, 1924 |
| 2,004,729 | Paul | June 11, 1935 |
| 2,136,417 | Downey | Nov. 15, 1938 |
| 2,157,323 | Coultas | May 9, 1939 |
| 2,375,848 | Hume | May 15, 1945 |
| 2,397,249 | Dostal | Mar. 26, 1946 |
| 2,496,493 | Raney | Feb. 7, 1950 |
| 2,551,322 | Ford | May 1, 1951 |
| 2,691,262 | Swertfeger | Oct. 12, 1954 |